July 20, 1926.
B. H. WILLIAMS ET AL
1,592,998
HEATER
Filed July 31, 1925
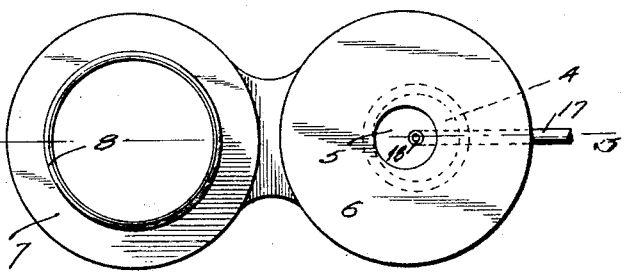
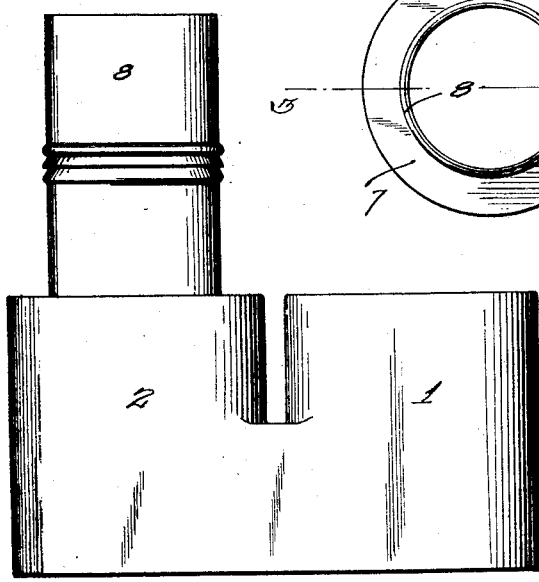
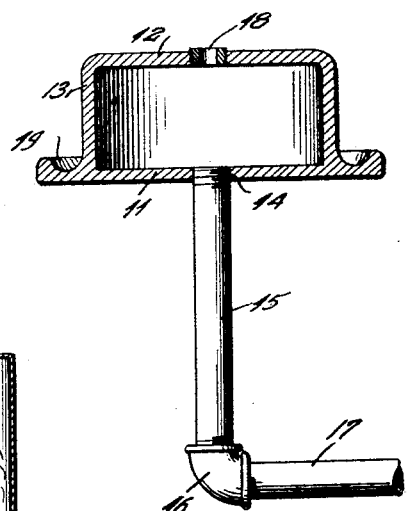
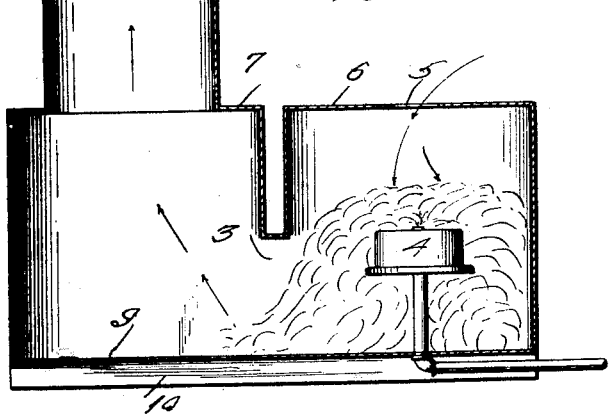
Inventors
Addison P. Brewer
Bernard H. Williams.
Percy H. Moore
Atty.

Patented July 20, 1926.

1,592,993

UNITED STATES PATENT OFFICE.

BERNARD H. WILLIAMS, OF COVINA, AND ADDISON P. BREWER, OF MONROVIA, CALIFORNIA.

HEATER.

Application filed July 31, 1925. Serial No. 47,296.

Our invention relates to improvements in heaters, and is more particularly directed to that type of heater wherein crude oil is used as a fuel.

The object of our invention is to provide a heater having a combustion chamber in which is positioned a generator to which the fuel is fed by gravity or pressure and when it is ignited air entering the combustion chamber causes the flame to envelop the generator, thereby heating the same and thus converting the crude oil into a gas vapor.

Referring to the accompanying drawings:—

Figure 1 is a side elevation of our improved heater.

Figure 2 is a top plane view of the same.

Figure 3 is a vertical sectional view taken on the line 3—3 of Figure 2, and

Figure 4 is an enlarged transverse sectional detail view of the generator.

Referring to the accompanying drawings in detail, wherein like reference characters denote corresponding parts throughout the several views, the heater as herein described is composed of two cylindrical drums 1 and 2 which are connected by a passage 3. The drum 1 receives therein a generator 4, which will hereinafter be more fully described, the same being positioned below an opening 5 arranged centrally of the drum head 6. The drum 2 has secured to its head 7 a vertically extending stack 8 through which the heat generated within the drum 1 passes out from the heater.

The heater as hereinabove described is preferably formed of sheet metal and may be constructed in any desired manner, provided that it is composed of two compartments connected by a passage. As disclosed in the drawings, the side walls of the heater project below its bottom 9, thus forming a suitable support for the heater, as indicated by the numeral 10.

The generator as illustrated in the drawings is composed of a cylindrical casting having a bottom wall 11, a top wall 12 and a side wall 13. The central portion of the bottom wall 11 is provided with a threaded opening 14 which receives therein the threaded end of a supporting pipe 15, the same passing upwardly through the bottom 9 of the heater and conveys to the generator 4 the fuel to be consumed. The lower end of the pipe 15 has connected thereto, by an elbow 16, a pipe 17 which communicates with a suitable fuel reservoir, not disclosed in the drawings. The generator 4 is provided with a removable nipple or opening 18 in its top wall through which fuel passes and prior to its ignition flows over the top wall 12, down the side wall 13 and is collected within a trough 19 formed integrally with the bottom wall 11 and concentrically with the main body of the generator.

Having thus fully described our invention we will now explain briefly its operation:—Fuel, preferably crude oil, is fed to the interior of the generator 4 through the pipe 15 and in due time completely fills the generator, flowing out through the opening 18, over the top wall 12 and down into the trough 19 where it is ignited. The heat from the burning oil tends to heat the body of the generator thereby vaporizing the oil therein and in due time the flame will be in line with the opening 18 as the vapor passes therefrom. In order to insure the continued vaporization of the oil within the generator, air is permitted to enter the drum 1, or combustion chamber through the opening 5, the incoming air being directed down upon the flame causing the same to spread and envelop the generator and thus properly vaporizing the fuel contained therein. The products of combustion then pass from the drum 1 through the passage 3 and into the drum 2 from which they pass out through the stack 8.

From the foregoing description it is thought that the advantages of our improved heater will be clearly apparent and it is to be understood that minor changes in the structure may be resorted to without departing from the spirit or sacrificing any of the advantages of the invention.

Having thus fully described our invention, what we claim as new, and desire to secure by Letters Patent, is:—

A heater of the class described composed of a cylindrical combustion chamber having a central restricted air inlet in the top thereof and a cylindrical heating chamber mounted in a spaced, side by side relation upon a common base, the upper portions of said chambers being separated by a depending division wall and the lower portions thereof being in communication with each other, a fuel generator within the combustion chamber and in alignment with said restricted opening, said generator having an outlet lying within a horizontal plane above the lower portion of said division wall, whereby the air entering said restricted opening will spread the flame from said generator downwardly and around the generator for further vaporization of the fuel and will sweep the products of combustion from the combustion chamber into the heating chamber.

In testimony whereof we affix our signatures.

BERNARD H. WILLIAMS.
ADDISON P. BREWER.